3,681,301
MOISTURE CURABLE RESIN COMPOSITIONS
John H. Bateman, Haverstraw, N.Y., assignor to Ciba-Geigy Corporation
No Drawing. Filed Aug. 3, 1970, Ser. No. 60,721
Int. Cl. C08g 23/00
U.S. Cl. 260—79                  19 Claims

ABSTRACT OF THE DISCLOSURE

Compositions which cure to elastomers upon exposure to moisture comprise a resin containing a plurality of mercaptan groups, a polyfunctional hydroxamoyl halide and a latent base. The compositions are useful as sealants and caulking agents.

BACKGROUND OF THE INVENTION

The present invention deals with resin compositions which are elastomers which possess exceptionally good physical properties, especially in sealant and caulking applications. The resin compositions described below can be premixed and packaged in convenient moisture-proof dispensers. Upon application the resins cure quickly into elastomeric compositions with superior physical properties. Thus when these compositions are employed as sealants or caulking compounds they give reliable and reproducible results of superior physical properties.

DETAILED DESCRIPTION

The compositions of this invention which cure upon exposure to moisture comprise a resin containing a plurality of mercaptan groups, a poly(hydroxamoyl halide) and a latent base which is inert in the absence of water or heat.

Any resin containing a plurality of mercaptan groups can be used in preparing the compositions of this invention. By plurality of mercaptan groups is meant that there are at least two mercaptan groups per polymer chain in the resin. Illustrative examples of such resins are given below:

(1) Mercaptan containing polyester-polysulfide resins which are composed predominately of recurring bivalent radicals of the formula —(S—$C_nH_{2n}$—$CO_2$—R—S—) and terminated with mercaptan groups in which $n$ is an integer from 1 to 3 and R is an esterifying radical not containing a mercaptan group or disulfide linkage. A more detailed description of this type of resin is given in British Pat. No. 1,151,924 and U.S. Pat. No. 3,465,057.

(2) Hydroxyl containing mercaptan resins containing two to three terminal mercaptan groups per chain prepared by reacting a polypropylene oxide polyol with epichlorohydrin followed by treatment with sodium sulfhydrate. This type polyether resin system is described in U.S. Pat. No. 3,457,219. In a similar manner the mercaptan terminated polyether resins without the hydroxyl groups, such as a mercaptan terminated polypropylene oxide, can also be employed.

(3) Mercaptan terminated polysulfides of the formula HS—$(RSS)_x$RSH wherein R is alkylene, alkyleneoxyalkylene, alkylene thioalkylene and $x$ is an integer from 3 to 100. A more detailed description of these resins is given in U.S. Pats. Nos. 3,361,720, 2,789,958 and 2,466,963.

(4) Mercaptan terminated polyester sulfide polymers as described in U.S. Pat. No. 3,397,189 and polyethers with pendant mercaptan groups along the chain which are described in U.S. Pat. No. 3,361,723.

Although any mercaptan containing resin can be employed in the practice of this invention, the preferred resins are mercaptan terminated polysulfides Such resins can be prepared by reacting an organic dihalide and sodium polysulfide. The preparation of such resins is described in greater detail in U.S. Pat. Nos. 3,361,720, 2,789,958 and 2,466,963.

To obtain the elastomeric products of this invention with their superior properties, it is necessary to cure the resin. This can be accomplished with a poly(hydroxamoyl halide) preferably a poly(hydroxamoyl chloride), and a latent base in the presence of moisture. Given a relatively short polymer backbone (liquid resin) of known molecular weight and of known chemical structure, soft rubbers of good elongation at constant crosslink density are obtained by having the curing sites at the chain ends of the prepolymer molecule. Materials of higher modulus and less elongation are obtained by having the curing sites distributed randomly along the resin backbone and in numbers greater than two.

The polyfunctional hydroxamoyl halides which can be used as curing agents in accordance with this invention have the following general formulae:

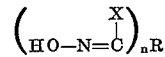

where R is an organic radical inert to the curing reaction or a carbon to carbon bond, X is a halide radical, and $n$ is an integer greater than 1. Thus, R can be alkylene, cycloalkylene, arylene, aralkylene, alkarylene, alkylenediarylene, cycloalkylene-dialkylene, arylene-dialkylene, etc., radicals such as methylene, ethylene, trimethylene, tetramethylene, pentamethylene, hexamethylene, octamethylene, cyclohexylene, cyclopentylene, xylylene, phenylethylene, phenylenedimethylene, phenylenediethylene, methylenediphenylene, ethylenediphenylene, cyclohexylenedimethylene, cyclopentylenedimethylene, etc., or an alkylene-oxyalkylene, arylene-oxyalkylene, aralkylene-oxyaralkylene, methylene-oxymethylene, ethylene-oxyethylene, phenylene-oxyphenylene, methylenephenylene-oxyphenylenemethylene, phenylenemethylene - oxymethylenephenylene, or the corresponding thio radicals such as ethylenethioethylene, phenylene-thiophenylene, phenylenemethylene-thiomethylenephenylene, etc., and sulfones such as ethylene-sulfonylethylene, m-bis(methylenesulfonyl)phenylene, etc. The maximum value for $n$ will, of course, be dependent on the number of carbon atoms in R, since the value of $n$ cannot exceed the valence of R. The halide radical, from which X is selected, comprise the chloride, bromide and iodide radicals. Polyfunctional nitrolic acids can also be used. Preferably X is chloride or bromide and most preferably chloride. The value of $n$ will be an integer of from 2 to 10 and most preferably 2 to 4.

Illustrative examples of the polyfunctional hydroxamoyl chlorides which are useful in this invention are
terephthaloyl-bis(hydroxamoyl chloride),
2,3,5,6-tetramethylterephthaloyl-bis(hydroxamoyl chloride),
isophthaloyl-bis(hydroxamoyl chloride),
malonoyl-bis(hydroxamoyl chloride),
succino-bis(hydroxamoyl chloride),
glutaro-bis(hydroxamoyl chloride),
1,4-cyclohexane-bis(carbonitrile hydroxamoyl chloride),
methylene-bis(p,p'-benzonitrile hydroxamoyl chloride),
methylene-bis(m,m'-benzonitrile hydroxamoyl chloride),
p-phenylene-bis(acetonitrile hydroxamoyl chloride),
4,4'-diphenylene-bis(carbonitrile hydroxamoyl chloride), and
1,5-naphthalene-bis(carbonitrile hydroxamoyl chloride);
and polyfunctional hydroxamoyl chlorides which have more than two hydroxamoyl chloride groups, such as
1,3,5-benzene-tris(carbonitrile hydroxamoyl chloride),
1,5,7-naphthalene-tris(carbonitrile hydroxamoyl chloride),
penta(acrylonitrile hydroxamoyl chloride),
deca(crontononitrile hydroxamoyl chloride), as well as polyfunctional hydroxamoyl chlorides such as
2,2′-oxybis(ethyl carbonitrile hydroxamoyl chloride), i.e.,
2,2′-bis(carbonitrile hydroxamoyl chloride) diethyl ether,
4,4′-oxybis(phenyl carbonitrile hydroxamoyl chloride), i.e.
4,4′-bis(carbonitrile hydroxamoyl chloride)diphenyl ether,
2,2′-thiabis(ethyl carbonitrile hydroxamoyl chloride,
4,4′-thiabis-(phenyl carbonitrile hydroxamoyl chloride-
oxal-bis(hydroxamoyl chloride), etc.

Mixtures of two or more polyfunctional nitrile hydroxamoyl chlorides can also be used, if desired.

Another group of polyfunctional hydroxamoyl halides that are useful in this invention are the polyfunctional carbonyl hydroxamoyl chlorides having the formula:

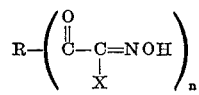

wherein R, X and $n$ are defined above, as for example,
oxalkyl bis(N-hydroxy formimidoyl chloride),
malonyl bis(N-hydroxy formimidoyl chloride),
succinyl bis(N-hydroxy formimidoyl chloride),
adipyl bis(N-hydroxy formimidoyl chloride),
sebacyl bis(N-hydroxy formimidoyl chloride),
1,2,3,-propane-tris(glyoxylo hydroxamoyl chloride)
1,2,4-pentane-tris(glyoxylohydroxamoyl chloride),
1,4-cyclohexane-bis(glyoxylohydroxamoyl chloride),
p-xylylene-bis(glyoxylohydroxamoyl chlorides),
1,1′-dimethyl thiobis(glyoxylohydroxamoyl chloride),
2,2′-diethyl bis(glyoxylohydroxamoyl chloride),
isophthalyl bis(N-hydroxy formimidoyl chloride),
terephthalyl-bis(N-hydroxy formimidoyl chloride,
4,4′-bis(phenylglyoxylohydroxamoyl chloride),
4,4′-methylene-bis(phenylglyoxylohydroxamoyl chloride),
4,4′-oxybis(phenylglyoxylohydroxamoyl chloride),
4,4′-thiabis(phenylglyoxylohydroxamoyl chloride), polymers containing pendant carbonitrile hydroxamoyl chloride groups, as for example, ethylene-acrylic acid copolymers and partially hydrolyzed poly(alkyl acrylate) where two or more of the pendant carboxyl groups have been converted to carbonyl carbonitrile hydroxamoyl chloride groups, etc.

Still another group of polyfunctional hydroxamoyl halides that can be used as curing agents in accordance with this invention are the polyfunctional carbonyl hydroxamoyl chlorides, having the general formula

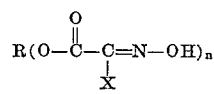

wherein R, X and $n$ are defined above, as for example, the ethylene glycol, resorcinol, 4,4′-dihydroxybiphenylene, iso-propylidene-4,4′-bisphenol, etc., esters of carboxy carbonitrile chlorides, etc. The above discussed polyfunctional hydroxamoyl halides are the preferred curing agents. However, polyfunctional carbonylnitrolic acids can also be employed.

In some embodiments of this invention the latent base required for curing include the oxides of the alkali and alkaline earth metals. Typical compounds of this kind include barium oxide, calcium oxide, lithium oxide, magnesium oxide, etc. By latent base is meant a metal oxide which under anhydrous conditions remains inert relative to the curing agent, but which, in the presence of moisture and heat, yields an alkaline material that reacts with a precursor of a polyfunctional hydroxamoyl halides resulting in the curing of the resin.

In still another embodiment of this invention the latent base comprises molecular sieve material containing an alkaline substance that is displaced by or driven out of the sieve material by water. Molecular sieve material, generally available as a free-flowing powder, has an interstitial structure with a high degree of adsorptive affinity for polar molecules. Generally, molecular sieve material consists essentially of crystalline alumino-silicate with a crystal structure of $SiO_4$ tetrahedra and $AlO_4$ tetrahedra that form a cross-linked network with uniform spherical cavities interconnected by uniform openings. Such material is described in the U.S. Pat. Nos. 2,882,243 and 2,882,244, to Milton. Preferred examples of alkaline substance contained in the molecular sieve material under the concepts of this invention include ammonia as well as primary, secondary and tertiary amines. Preferred combinations of alkaline substance and molecular sieve material comprise ammonia and sodium zeolite A (described in the '243 patent to Milton), primary amine (methylamine, ethylamine, ethylene diamine, and the like) and calcium-magnesium zeolite A (described in the '243 patent to Milton), and secondary and tertiary amines (dimethylamine, diethylamine, diethylene triamine, trimethylamine, triethylamine, piperazine, and the like) and sodium zeolite X (described in the '244 patent to Milton).

A latent base of this kind is made by contacting preferably at 0–25° C. anhydrous finely divided molecular sieve material with an anhydrous alkaline substance usually alone, when it is normally liquid, but in solution in a suitable anhydrous solvent, when it is normally gaseous or solid. The quantity of alkaline substance, quantity of molecular sieve material and length of time of contacting are selected to obtain a desired concentration of adsorbed alkaline substance in the molecular sieve material. Usually the preferred maximum concentration of adsorbed alkaline substance in the molecular sieve material is about 15–20% by weight of the molecular sieve material, but higher and lower operable concentrations are within the broader concepts of this invention. Subsequently, excess and unadsorbed alkaline substance, if any, are removed from the molecular sieve material as by washing the material.

Sometimes the advantage in employing as a latent base material a molecular sieve containing alkaline substance is that heat can be used in addition or in place of moisture to initiate the curing reaction. Generally speaking, alkaline substance that is displaced or driven out of molecular sieve material by water is also displaced or driven out by heat. Hence, when it is desired to initiate by heat the cross-linking reaction, preferably only sufficient heat is applied to the cross-linkable composition to cause exudation of the desired quantity of alkaline substance from the molecular sieve material.

The bis (hydroxamoyl chlorides) are readily obtained by a reaction of an aldehyde oxime with a chlorinating agent such as nitrosyl chloride, chlorine, etc. The carbonyl hydroxamoyl chlorides can be prepared from poly-(haloacetyl) compounds, such as bis(chloroacetyl), methylene-bis(chloroacetyl), ethylene-bis(chloroacetyl), o-, m-, and p - bis(chloroacetyl)benzene, 4,4′ - bis(chloroacetyl)biphenyl, bis(4-chloroacetylphenyl) ether, by a reaction of the poly(haloacetyl) compound with a nitrosating agent such as an alkyl nitrite, $N_2O_3$, nitrosyl chloride, etc., and hydrogen chloride under anhydrous conditions.

The carbonyl hydroxamoyl chlorides can also be prepared by a reaction of an amino ester with sodium nitrite and hydrogen chloride to form a diazo ester followed by conversion of the diazo ester with nitrous acid and hydrogen chloride to the hydroxamoyl chloride. Thus, for example, with glycine or one of its precursors, such as aminoacetonitrile, glycinate esters of diols, triols, etc., can be prepared, which can then be converted to polyfunctional carbonyl hydroxamoyl chlorides.

The polyfunctional carbonylnitrolic acids having the formula

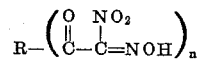

are prepared by the reaction of a polyketone with $N_2O_4$ which yields the poly(carbonylnitrolic acid) directly.

The polyfunctional carbonylnitrolic acids having the formula $$R-(O-\overset{O}{\underset{\|}{C}}-\overset{NO_2}{\underset{|}{C}}=NOH)_n$$

are derived from beta-keto esters. For example, acetoacetic acid esters can be readily prepared by the reaction of diketene with polyols and then nitrosating the beta-ketoester with aqueous nitrous acid to yield the corresponding oximinoketoester. Treatment of these compounds with concentrated nitric acid gives the nitrolic acid in excellent yield, and treatment of the nitrolic acid with a hydrogen halide then yields the hydroxamoyl halide. Actually, the reaction can be carried out in one step by reacting the oximinoketoester with a mixture of nitric acid and hydrogen halide to yield the hydroxyamoyl halide directly.

The polyfunctional nitrolic acid with the formula $$R\left(\overset{NO_2}{\underset{|}{C}}=NOH\right)_n$$

can be obtained by reacting the corresponding polyfunctional hydroxyamoyl halide such as the chloride with silver nitrate. Still other methods of preparing the above mentioned nitrolic acid will be apparent to those skilled in the art.

The composition of this invention is stable for prolonged periods when kept under basically anhydrous conditions. Thus, prior to the addition of a latent base the other components should be dryed which can be accomplished by any of the following methods:

(1) Vacuum distillation to remove water;
(2) Azeotropic removal of water by first adding a solvent which forms an azeotropic solution, such as toluene, xylene, ether or the like;
(3) Addition of drying agent, such as magnesium sulfate, molecular sieve and the like.

According to the present invention, the resins are cured at ambient temperatures of about 25° C. To cure the resin, generally a stoichiometric amount, or a small excess of a hydroxamoyl halide preferably the hydroxamoyl chloride is employed with a latent base in the presence of moisture.

The amount of polyfunctional hydroxyamoyl halide employed (based on the weight of the polymer) will be from about 0.05% to about 50%, preferably from about 3% to about 20%.

The latent base, in the form of the above-mentioned oxides or amine loaded molecular sieves, should be present in at least a stoichiometric amount based on the poly(hydroxamoyl halide) preferably in an excess of from about 10% to about 50% over stoichiometric amount required.

The molecular weight of the resins used in this invention is in the range of from about 1000 to about 25,000. Most preferably the molecular weight is from about 2,000 to about 10,000.

The compositions of this invention optionally can also contain a number of additives which will provide the final product with particular properties desired. Thus, the composition can contain fillers such as carbon black, silicone dioxide and the like, stabilizers such as UV-stabilizers, antioxidants, pigments such as titanium dioxide, plasticizers or flexibilizers, hydrogenated terphenyl (HB 40 Monsanto) and the like and other suitable additives which would yield a composition particularly useful for a specific application.

The following non-limiting examples are presented to more clearly illustrate the nature of this invention.

Example 1

A commercial mercaptan terminated polysulfide resin (29.6 g.) having the general formula $$H-(C_2H_4O-CH_2H_4-SS)_x-$$
$$C_2H_4O-CH_2-OC_2H_4-SH$$

and having a molecular weight of about 4,000 and a functionality of about 2.3 (Thiokol LP-32, supplied by Thiokol Chemical Corporation) was thoroughly mixed with an equivalent amount of (2.0 g.) terephthaloyl bis-(hydroxamoyl chloride) until a clear solution was obtained. Anhydrous calcium oxide (1.0 g.) was added and thoroughly mixed into the solution and the mixture set aside at room temperature. After two hours, the surface was tack free and after three days the material was thoroughly cured and elastomeric.

Example 2

The procedure of Example 1 was repeated but the calcium oxide was omitted. After three weeks there was no change in the appearance of the mixture and no sign of curing.

Example 3

The procedure of Example 1 was repeated but the terephthaloyl bis-(hydroxamoyl chloride) was omitted. After three weeks the composition was tacky, soluble and showed no elastomeric properties.

Example 4

The procedure of Example 1 was repeated but the final formulation was sealed in a jar under anhydrous conditions. After 5 months there was no noticeable change in the physical properties. When a sample of this material was withdrawn after 5 months of storage and exposed to the atmosphere it became tack free in about two hours and after three days was thoroughly cured to a tough elastomer.

Example 5

The procedure of Example 1 was repeated but the latent curing agent was 2.23 g. of 1,3,5-phenyltris(glyoxylohydroxamoyl chloride). Upon exposure to atmospheric moisture the resin became tack free in two hours and completely cured to a tough elastomer within 3 days.

Example 6

To 95 g. of the resin of Example 1 was added 6.4 g. of terephthaloyl bis(hydroxamoyl chloride) and 2 g. of toluene. The mixture was mixed thoroughly and the toluene removed under vacuum. After the mixture cooled to room temperature, 8.2 g. of Molecular Sieve (available from Union Carbide Corp. as CZ 1810) containing ethylene diamine at a concentration of about 10% based on the weight of the molecular sieve was added and the composition was mixed thoroughly under nitrogen. When exposed to the atmosphere at room temperature, the composition became tack free in about 2 hours and in 2 days it cured to a tough elastomer which was insoluble in benzene.

Example 7

A mercaptan terminated polypropylene oxide resin was prepared by treating a trifunctional polypropylene oxide with epichlorohydrin followed by treatment with sodium sulfhydrate. The resin was a clear white liquid having a molecular weight of about 6,000 and a functionality of 2.3 as measured by iodimetric titration. To 26.0 g. of this resin was added 1.82 g. terephthaloyl bis-(hydroxamoyl chloride) and thoroughly mixed at 40° C. until a clear solution was obtained. Calcium oxide (1.0 g.) was then added and thoroughly mixed into the solution. After standing three hours at room temperature the surface of the resin was tack free and appeared to be elastomeric. After three days at room temperature the resin had cured to a hard tough elastic material.

Example 8

To 100 g. of the resin of Example 7 was added 4.1 g. of terephthaloyl-bis-(hydroxamoyl chloride), 80 g. of anhydrous barium sulfate (Baryta white) filler and 2 g. of toluene. The mixture was mixed thoroughly and the toluene removed under vacuum at 100° C. After the mixture cooled to room temperature, 10 g. of calcium oxide and 2 g. of 4A molecular sieve was added and mixed thoroughly under nitrogen. When exposed to the atmosphere the composition was tack free in about 4 hours. After three days the composition had cured to a tough elastomer which was insoluble in benzene.

Example 9

A liquid resin with pendant mercaptan groups was prepared according to Example 1 of U.S. Pat. No. 3,361,723 and accordingly the predominate species in the resin possesses the following structure:

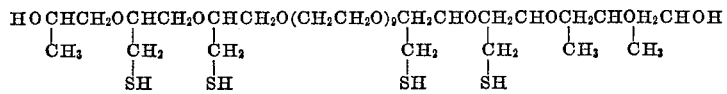

A portion of this material (10 g.) was thoroughly mixed with 2.5 g. of terephthaloyl bis-(hydroxamoyl chloride) and 2.0 g. calcium oxide. After three hours a tack free elastomer was obtained and after two days a hard tough elastomer formed which was insoluble in benzene.

Example 10

Employing the same procedure as in Example 9, except using 2.0 g. of barium oxide, the tack free product was obtained after 4 hours.

What is claimed is:

1. A moisture curable composition comprising:
   (a) a mercaptan containing resin;
   (b) a polyfunctional hydroxyamoyl halide having the formula selected from the group consisting of:

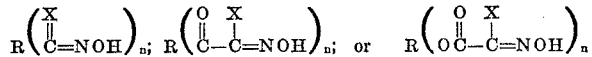

wherein
   R is an organic radical inert to the curing reaction;
   $n$ is an integer from 2 to 10, and
   X is a halogen.
   (c) A latent base which in the absence of moisture or heat is inert.

2. The composition of claim 1 wherein said resin is a mercaptan terminated polysulfide.

3. The composition of claim 1 wherein said resin is a mercaptan terminated polyether.

4. The composition of claim 1 wherein said latent base is calcium oxide.

5. The composition of claim 1 wherein said latent base is barium oxide.

6. The composition of claim 1 wherein said polyfunctional hydroxamoyl halide is terephthaloyl-bis-(hydroxamoyl chloride).

7. The composition of claim 1 wherein said polyfunctional hydroxamoyl halide is 1,3,5-phenyl-tris(glyoxylohydroxamoyl chloride).

8. The composition of claim 1 which comprises
   (a) a mercaptan terminated polysulfide resin
   (b) terephthaloyl-bis(hydroxamoyl chloride); and
   (c) calcium oxide.

9. The composition of claim 1 wherein said latent base comprises molecular sieve material containing an alkaline substance displaceable therefrom by moisture.

10. The composition of claim 9 wherein said alkaline substance is ethylene diamine.

11. A process of curing a mercaptan containing resin which comprises exposing to moisture said resin in admixture with a polyfunctional hydroxamoyl halide having the formula selected from the group consisting of:

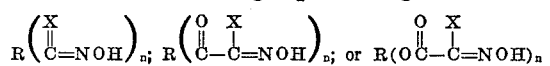

wherein R is an organic radical inert to the curing reaction;
$n$ is an integer from 2 to 10; and
X is a halogen,
and a latent base which in the absence of moisture or heat is inert.

12. The process of claim 11 wherein said latent base is calcium oxide.

13. The process of claim 11 wherein said latent base is barium oxide.

14. The process of claim 11 wherein said mercaptan containing resin is a mercaptan terminated polysulfide.

15. The process of claim 11 wherein said mercaptan containing resin is a mercaptan terminated polyether.

16. The process of claim 11 wherein said polyfunctional hydroxamoyl halide is terephthaloyl-bis(hydroxamoyl chloride) and the latent base is calcium oxide.

17. The process of claim 11 wherein said polyfunctional hydroxamoyl halide is 1,3,5-phenyl-tris-(glyoxylohydroxamoyl chloride).

18. The process of claim 11 wherein said latent base comprises molecular sieve material containing alkaline substance displaceable therefrom by moisture.

19. The process of claim 18 wherein said alkaline substance is ethylene diamine.

References Cited

UNITED STATES PATENTS

| | | | |
|---|---|---|---|
| 2,466,963 | 4/1949 | Patrick et al. | 260—79.1 |
| 3,225,017 | 12/1965 | Seegman et al. | 260—79.1 |
| 3,402,155 | 9/1968 | Kutch | 260—79 |
| 3,538,063 | 11/1970 | Sorg et al. | 260—79 |

OTHER REFERENCES

Jorczak et al., Industrial and Engineering Chemistry, "Polysulfide Liquid Polymers," vol. 43, pp. 324 to 328, February 1951.

JAMES A. SEIDLECK, Primary Examiner

M. I. MARQUIS, Assistant Examiner

U.S. Cl. X.R.

260—37 R, 37 AL, 79.1